H. C. BREWSTER.
PIPE COUPLING.
APPLICATION FILED NOV. 28, 1916.
1,233,175.
Patented July 10, 1917.
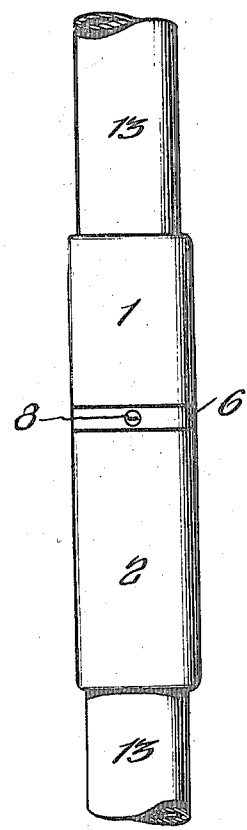
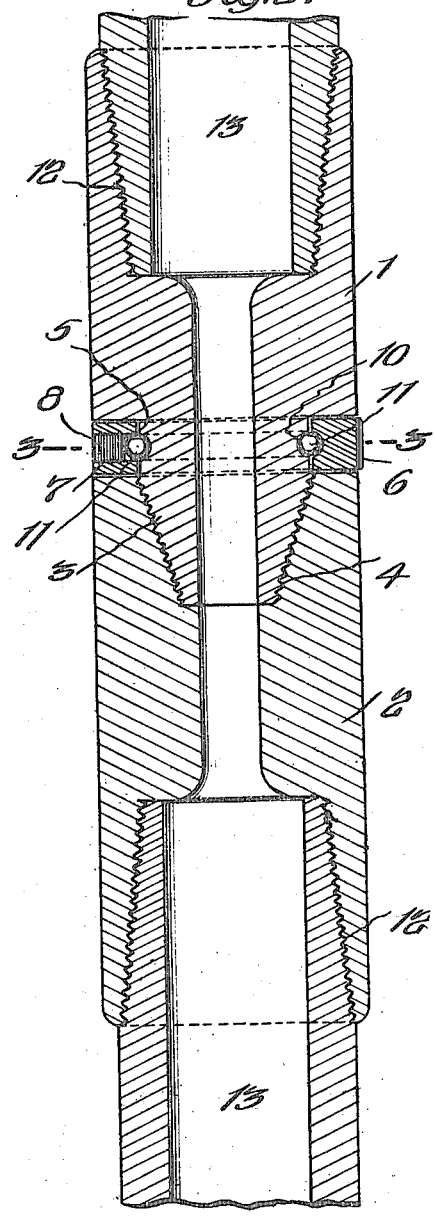
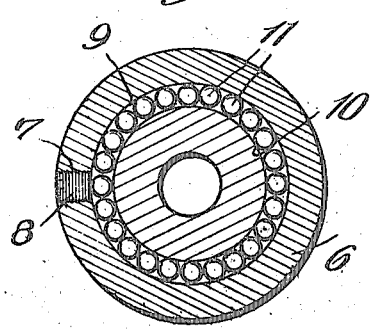
WITNESSES
INVENTOR
HARRY C. BREWSTER,
BY
ATTORNEYS

UNITED STATES PATENT OFFICE.

HARRY C. BREWSTER, OF SHREVEPORT, LOUISIANA.

PIPE-COUPLING.

1,233,175.  Specification of Letters Patent.  Patented July 10, 1917.

Application filed November 28, 1916. Serial No. 133,880.

*To all whom it may concern:*

Be it known that I, HARRY C. BREWSTER, a citizen of the United States, and a resident of Shreveport, in the parish of Caddo and State of Louisiana, have invented certain new and useful Improvements in Pipe-Couplings, of which the following is a specification.

My invention is an improvement in pipe couplings, and the invention has for its object to provide a coupling of the character specified wherein the joint is made by a tapered stem within a tapered box, with a ball-bearing ring for locking the stem against longitudinal movement, while permitting rotating of the ring with respect to the stem to prevent any possibility of sticking between the parts, and to reduce the friction between the joints thereby causing them to be easily unscrewed.

In the drawings:

Figure 1 is a front view of the improved coupling.

Fig. 2 is an enlarged longitudinal section, and

Fig. 3 is a section on the line 3—3 of Fig. 2.

In the present embodiment of the invention the coupling member consists of two sections 1 and 2, the section 1 having a reduced tapered threaded stem 3, which is received within a similarly tapered and similarly threaded opening in the section 2. The stem has a cylindrical portion 5 adjacent to the section 1, and the opening 4 is of such depth that when the stem is engaged with the opening, there will be a space between the adjacent ends of the sections corresponding in width to the width of the plain portion 5 of the stem.

Within this annular space between the adjacent ends of the sections and about the plain portion 5 of the stem, is arranged a ring 6, the said ring having a radially threaded opening 7 which is adapted to be closed by a screw plug 8, the said plug having a kerf, as shown, at its outer end for permitting the same to be inserted or removed. This opening 7 is midway between the edges of the ring, and at the opening the ring is internally grooved as shown at 9. The plain portion of the stem is similarly grooved as indicated at 10, and the grooves 9 and 10 coöperate to form a ball race for receiving a series of balls 11. These balls, as shown, provide a lock for locking the ring to the stem, while the said ring is rotatable with respect to the stem and section 1.

With the improved coupling the sections may be screwed tightly together, without the possibility of any sticking between the sections. The ring may be of any suitable material, and the ring acts as a protective for the joint between the elements 3 and 4. As will be seen, the sections 1 and 2 have registering openings for permitting the passage of liquid, and each section is provided at its outer end with an internally threaded tapered opening 12 for receiving the tapered portion of a connection 13. It will be understood that the balls may be inserted and removed through the opening 7, after the plug 8 has been removed.

It will be noted that the ring is fitted in the space between the adjacent ends of the sections to an exact fit, so that when the tapered stem is screwed into the tapered box there is only allowance enough made in the thickness of the ring to allow the threads in the box and stem to seat perfectly, and any strain by screwing up the joint will be thrown on the ring instead of straining the threads. By having the loose ring between the sections, it thereby reduces the friction to a minimum and allows the same to be readily unscrewed no matter how tight the joint may be screwed up.

When the threads 3 and 4 interengage to their full depth, the ring 6 simultaneously contacts with the end of the member 2, and transmits the pressure due to any further screwing or the pressure due to axial thrust, to the balls 11 and their seat in the surface 5. All strain being thus carried by the ball bearings, sticking will be prevented.

I claim:

1. A pipe joint comprising sections adapted for connection with the pipes, one of the said sections having a tapered socket and the other a tapered stem having threaded engagement with the socket, and having a cylindrical portion between the threaded portion and the end of the section, a ring encircling the plain portion between the sections and rotatable with respect to the sections, the ring and the cylindrical portion having coöperating annular grooves forming a ball race, and balls in the race, said balls being adapted to receive the thrust between the ring and the stem when the stem is screwed home to prevent sticking.

2. A pipe joint comprising sections, one of which is provided with a tapered socket and the other with a tapered stem having threaded engagement with the socket and having a cylindrical portion between the threaded portion and the end of the section, and a ring encircling the cylindrical portion between the sections, and a ball bearing between the ring and the cylindrical portion for receiving the thrust of the stem when the stem is screwed home.

HARRY C. BREWSTER.